US012269723B2

(12) United States Patent
Iotti

(10) Patent No.: US 12,269,723 B2
(45) Date of Patent: Apr. 8, 2025

(54) FORK-CARRIER

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 671 days.

(21) Appl. No.: 17/502,547

(22) Filed: Oct. 15, 2021

(65) Prior Publication Data

US 2022/0127119 A1 Apr. 28, 2022

(30) Foreign Application Priority Data

Oct. 23, 2020 (IT) ........................ 102020000025180

(51) Int. Cl.
*B66F 9/12* (2006.01)

(52) U.S. Cl.
CPC ..................................... *B66F 9/12* (2013.01)

(58) Field of Classification Search
None
See application file for complete search history.

(56) References Cited

U.S. PATENT DOCUMENTS 3,024,933 A * 3/1962 Albert .................... B66F 9/065 414/707
6,056,503 A 5/2000 Way et al.
6,132,164 A 10/2000 Way et al.
6,287,073 B1 * 9/2001 Lindgren .................. B66F 9/12 414/667
8,827,625 B2 * 9/2014 Biggerstaff ........... E02F 3/3411 414/718
11,440,781 B2 * 9/2022 Iotti ........................ B66F 9/142
2005/0220588 A1 10/2005 Turnbull et al.
2020/0223677 A1 7/2020 Iotti

FOREIGN PATENT DOCUMENTS

EP 0816282 A1 1/1998
EP 1531141 A1 5/2005
EP 2592042 A1 5/2013
EP 3683184 A1 7/2020
JP S5954499 U 4/1984

* cited by examiner

*Primary Examiner* — Michael S Lowe
(74) *Attorney, Agent, or Firm* — Chrisman Gallo Tochtrop LLC

(57) ABSTRACT

Described is a fork-carrier (2) for a telehandler, comprising: a frame (20) for supporting a fork equipped with an upper structure (200) comprising a gripping rod (21), which, in use, is positioned horizontally and designed to be removably attached to a coupling device (101), which is fitted to an operating arm (102) of a telehandler (10); and a lower contact element (25) designed to make contact with the rear of prongs (3) of fork; wherein the upper structure (200) is connected to the contact element (25) exclusively by means of one or more joining members (26) which are positioned inside the lateral dimensions of the supporting frame (20).

10 Claims, 4 Drawing Sheets

FORK-CARRIER

This invention relates to an improved fork-carrier, with increased operational visibility, designed for use on telescopic handlers or "telehandlers".

An accessory is known in the prior art commonly called "forks" or "fork" designed to be mounted on the telescopic operating arm of telehandlers, in order to move loads.

The accessory includes a structure or frame known in the jargon of the trade as "fork-carrier", to which the forks are coupled, that is to say, the tool equipped with prongs for inserting pallets or bales of hay or the like on forks. More in detail, as shown in FIGS. 1 and 2, in a prior art solution, the prongs of the fork are slidably mounted on one or more supporting pins P inserted in suitable slots of lateral plates L of the fork-carrier T.

The prior art fork-carrier frame T, which may also be sold separately, is rectangular and has a thick upper tubular crosspiece Q, for example with a quadrangular cross section, which joins the top of the above-mentioned lateral plates L.

Moreover, on the rear side and in a lower position relative to the slots, the frame T has a gripping tubular element S, which is attached in a removable fashion to an attachment device with which the operating arm is provided. Although this solution is currently used in practice, it has some limitations which, in certain circumstances, make it difficult to use and which will be explained below.

In order to be able to correctly insert forks in a load which is rested on the ground, the operator of the telehandler needs to clearly see the load and how the tips of the prongs of the forks are positioned relative to the load, so as to insert them in the correct manner in the base pallet.

However, the structure of the current fork-carriers T has several elements which obstruct the viewing and in particular: the side plates of the frame L, the upper crosspiece Q and the sliding pins P of the two forks.

More in detail, since in the telehandlers the cab is mounted alongside the operating arm and is therefore off centre relative to the accessory, one of the two side panels L always particularly obstructs the view.

The configuration of the prior art fork-carriers sometimes forces the operator to perform some operations, in preparation for inserting the forks in the load, for inclining and moving the accessory to have an adequate idea of the mutual arrangement between the tips of the prongs of the forks and the pallet at the base of the load.

These manoeuvres are inconvenient and the need is therefore felt in the market fora telehandler apparatus with improved visibility which overcomes the limits of the prior art.

The technical purpose which forms the basis of the invention is to provide an improved fork-carrier for telehandlers which satisfies the above-mentioned need.

The specified aim is attained by the invention made according to claim 1. Further features and advantages of the invention are more apparent in the non-limiting description of a preferred embodiment of the accessory which includes the proposed fork-carrier, as illustrated in the accompanying drawings, in which:

Figure 2:
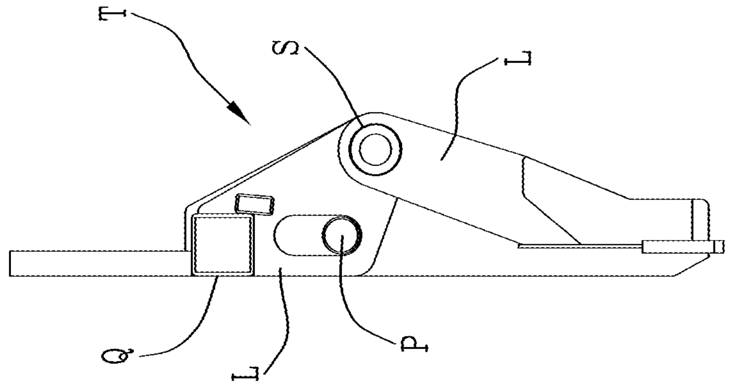
Fig.2 Prior Art
FIGS. 1 and 2 are, respectively, a front view and a side view of the prior art fork-carrier.
Figure 1:
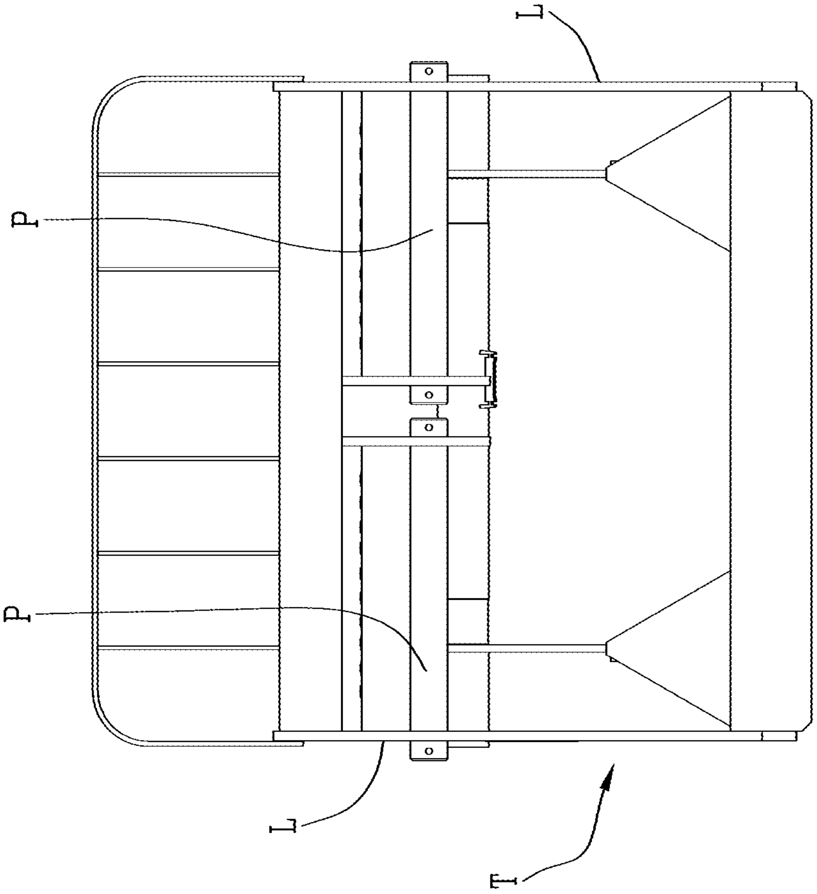
Fig.1 Prior Art

With reference to the accompanying drawings, the numeral 1 denotes in its entirety an accessory for the telehandler 10 which includes a fork-carrier 2 according to the invention and the prongs 3 of the fork supported by it.

The fork-carrier 2 proposed comprises a supporting frame 20 designed to be attached in a removable fashion to a hooking device 101, positioned at the distal end of the operating arm 102 of the telehandler 10.

Figure 3:
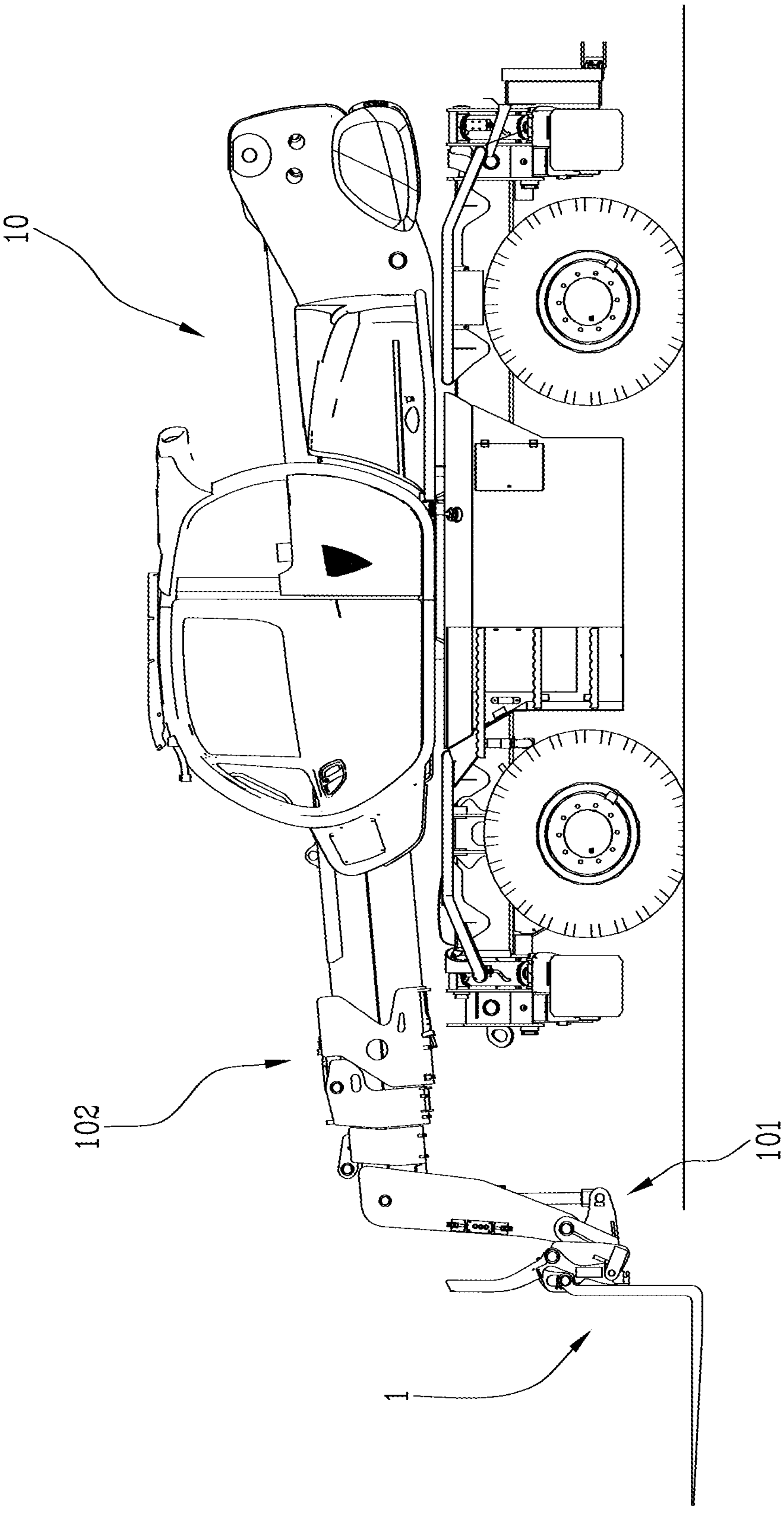
FIG. 3 is a side view of the invention when it is attached to the operating arm of a telehandler.
Figure 5:
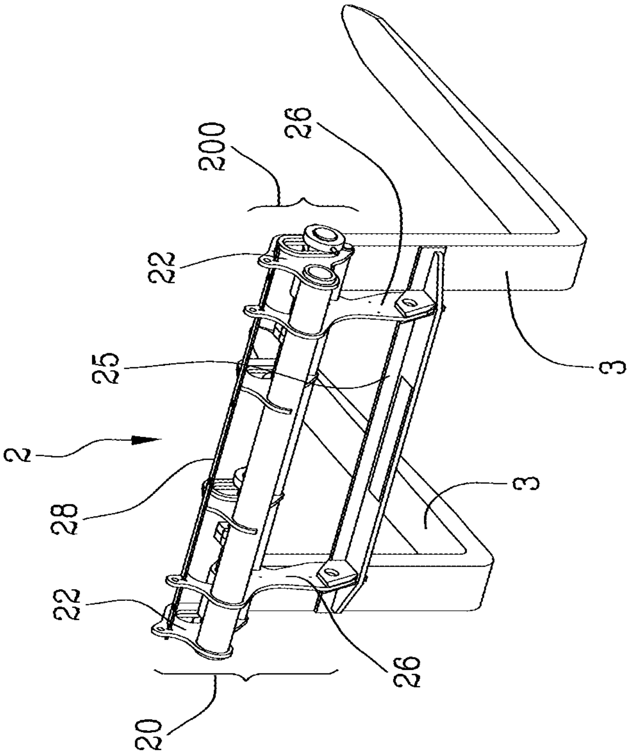
FIGS. 4 and 5 are perspective views of the apparatus according to the invention.
Figure 4:
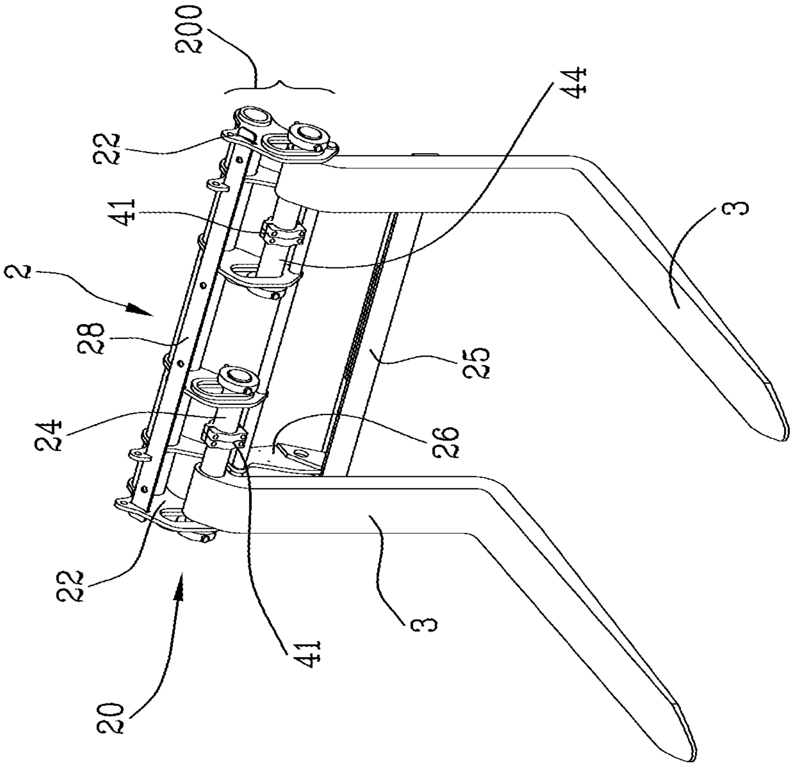

More in detail, the frame 20, preferably configured with a lattice structure, is fastened to the operating arm 102 at the rear, whilst the prongs 3 are mounted at the front (see FIG. 3).

It should be noted that the expression "at the front" referred to the fork-carrier 2 refers to its side (or face) opposite the machine 10 and the arm 102, whilst the expression "at the rear" refers to the opposite side.

In general, when the terms "front", "frontal", "forward", "rear", "upper", "lower", "side", "vertical" or "horizontal" are used in this description, in relation to the accessory according to the invention, in its entirety or with regard to its components, reference is made to how it is positioned in space during its use, that is to say, when it is coupled to the above-mentioned coupling device 101.

The supporting frame 20 comprises an upper structure 200 which has a horizontal gripping rod 21, which is designed to be removably attached to the coupling device 101 of the operating arm 102. Preferably, the gripper rod 21 comprises a circular tubular element positioned behind in the fork-carrier 2, at an upper portion of the above-mentioned structure 200.

In a front position, the prongs 3 of the fork, which may have the L-shaped configuration shown in the drawings, are suspended from the frame 2 and therefore comprise a horizontal segment and a vertical segment.

Figure 7:
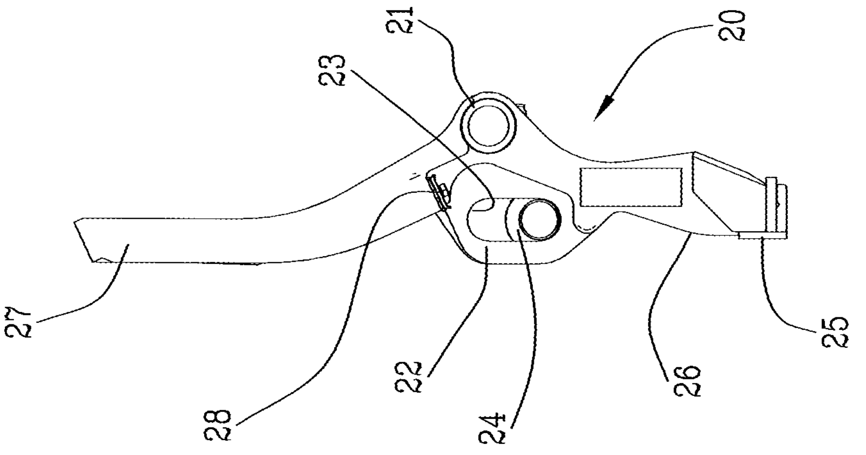
FIGS. 6 and 7 are, respectively, a front view and a side view of the fork-carrier according to the invention.

More specifically, the upper structure 200 of the frame 2 includes two side plates 22 which are positioned vertically and are provided with respective slots 23 for receiving one or more suspension pins 24 of the fork (see FIG. 7).

In practice, in the slots 23, which are located at a position lower than the rear gripping tubular element 21, the suspension pins 24 which carry the prongs 3, with the possibility of sliding and rotation, are inserted; in detail, the pins 24 are inserted in the through hole which the prongs 3 have at the upper end of the respective vertical segment, whilst two jaws 41, which can be removably coupled to the pins 24, for example by means of butterfly screws, can lock the prongs 3 against the side plates 22 provided with the above-mentioned slots 23.

In still more detail, the suspension pins 24 are located in the frame 20 in a forward position relative to the gripper rod 21.

The frame 20 of the fork-carrier 2 then includes at least one lower contact element 25, parallel to the gripping rod 21, which is designed to abut the rear of the prongs 3 of the fork; preferably, the contact element includes a plate 25, the length of which extends horizontally and the width vertically, located behind the prongs 3 and under the upper structure 200.

According to an important aspect of the invention, the frame 20 comprises one or more joining members 26 which are the only elements which connect its upper structure 200 to the contact element 25 and which are positioned inside the lateral dimensions of the supporting frame 20.

In other words, the frame 20 according to the invention, unlike that of the prior art, does not have end lateral uprights, which define the overall size and connect the coupling zone of the prongs 3 with the lower contact part of the prongs 3.

Figure 6:
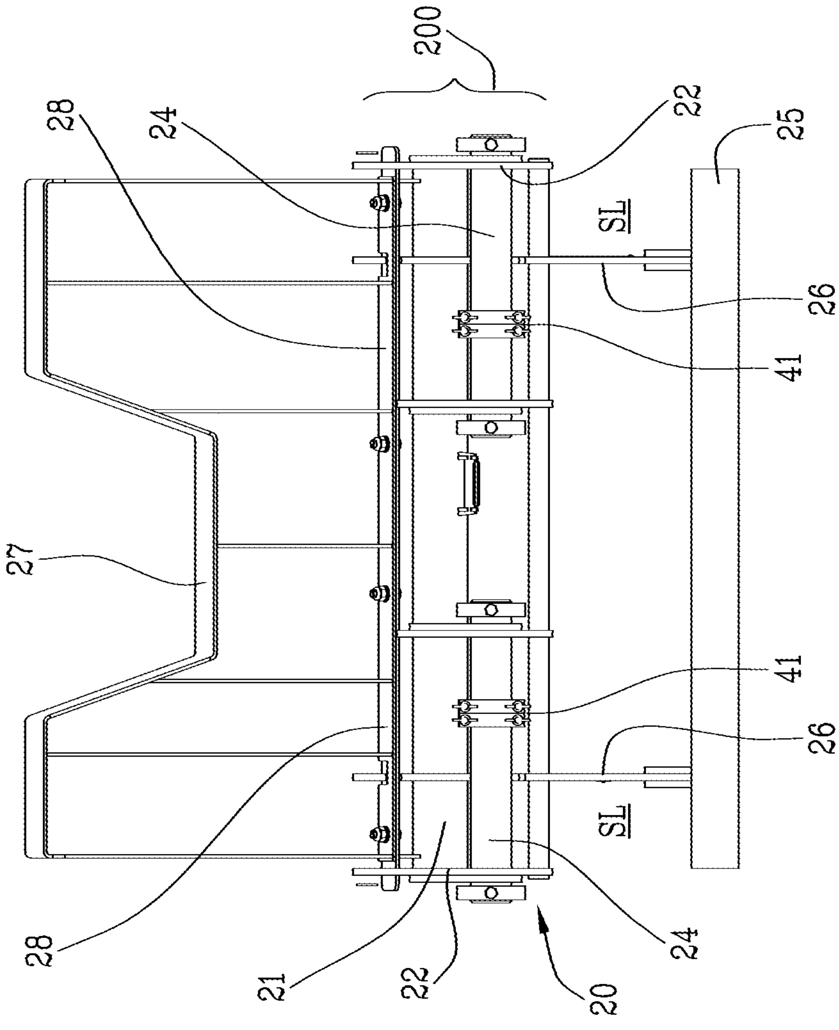

For the fork-carrier 2 according to the invention, on the other hand, the connection between the contact plate 25 for the prongs 3 and the upper structure 200, which connects the accessory 1 to the coupling device 101 and carries the prongs 3, is achieved only by the above-mentioned joining members 26, preferably comprising vertical plates, transversal to the contact plate 25, which leave free two lateral spaces SL between the upper structure 200 and the contact plate 25 (see in particular FIG. 6).

Advantageously, this allows the operator in the cabin to be able to see with fewer obstacles the tip of the prongs 3 and the load, unlike the prior art which, as explained in the introduction, always has at least one side panel in a position which obstructs the viewing of the operator.

Preferably, the suspension pins 24 of the prongs 3, which are parallel to the gripping rod 21, define, together with the latter, a common plane inclined downwards in a front direction.

In this way, in use, pins 24 and gripping rod 21 are partly or completely superposed relative to the operators point of view, further reducing the components which obstruct the free view of the prongs 3 and the load to be lifted.

In practice, the above-mentioned common plane of the pins 24 and of the gripping rod 21 obliquely strikes a horizontal plane in which the above-mentioned horizontal portions of the prongs 3 lie and preferably form with them an angle of between 0 and 30 degrees.

Lastly, according to an aspect already described in patent application EP3683184 in the name of the same Applicant and therefore incorporated herein by reference in relation to said feature, the frame 20 includes a top plate 28, on which the load-bearing grille 27 is mounted, which is inclined downwards in the front direction, so as not to obstruct the view by the operator of the tips of the forks and the load, or obstruct it as little as possible.

The invention claimed is:

1. A fork-carrier (2) for a telehandler, comprising: a frame (20) for supporting a fork equipped with an upper structure (200) comprising a gripping rod (21), which, in use, is positioned horizontally and designed to be removably attached to a coupling device (101), which is fitted to an operating arm (102) of a telehandler (10); and at least one lower contact element (25) designed to engage the rear of prongs (3) of said fork; wherein said upper structure (200) is connected to said contact element (25) exclusively by means of one or more joining members (26) which are positioned inside the lateral dimensions of said frame (20), and wherein said upper structure (200) includes two side plates (22) and said one or more joining members (26) are positioned inside the lateral dimensions of said frame (20) and said two side plates (22) of the upper structure (200).

2. The fork-carrier (2) according to claim 1, wherein said contact element comprises a vertical contact plate (25).

3. The fork-carrier (2) according to claim 1, wherein said upper structure (200) includes two side plates (22), positioned vertically and provided with respective slots (23) for receiving suspension pins (24) of the fork, the slots (23) being at least partly located below the gripping rod (21).

4. An accessory (1) for a telehandler (10) comprising a fork-carrier (2) according to claim 3, equipped with one or more suspension pins (24) which are inserted in the above-mentioned slots of the upper structure (200) of the frame (20) of the fork-carrier (2) and carry prongs (3) which are also included in the accessory (1), said pins (24) being parallel to the gripping rod (21) and defining with the latter a shared plane inclined downwards in a front direction.

5. The accessory according to claim 4, wherein said common plane of the pins (24) and of the gripping rod (21) strikes obliquely with a plane of the horizontal portions of the prongs (3).

6. The accessory according to claim 5, wherein the shared plane of the pins (24) and of the gripping rod (21) forms with the plane of the horizontal portions of the prongs (3) an angle of between 0 and 30 degrees.

7. The fork-carrier (2) according to claim 1, wherein said one or more joining members (26) are the only elements that connect said upper structure (200) to said at least one lower contact element (25).

8. The fork-carrier (2) according to claim 1, wherein two joining members (26) of said one or more joining members (26) are vertical plates, transversal to said at least one lower contact element (25), which leaves free two lateral spaces (SL) between said upper structure (200) and said at least one lower contact element (25).

9. The fork-carrier (2) according to claim 1, wherein said one or more joining members (26) are vertical plates, transversal to said at least one lower contact element (25), which leaves free two lateral spaces (SL) between said two side plates (22) and said at least one lower contact element (25) and said one or more joining members (26).

10. The fork-carrier (2) according to claim 1, wherein said one or more joining members (26) are positioned inside said prongs (3) of said fork.

* * * * *